United States Patent [19]

Newman

[11] Patent Number: 5,302,570

[45] Date of Patent: Apr. 12, 1994

[54] ENVIRONMENTAL PRODUCT CAPABLE OF ABSORBING OIL FROM THE SURFACE OF WATER, AND PROCESS

[75] Inventor: Harold C. Newman, Fallon, Nev.

[73] Assignee: Enviro-Clean Alaska, Inc., Portland, Oreg.

[21] Appl. No.: 970,938

[22] Filed: Nov. 2, 1992

[51] Int. Cl.$^5$ .................... B01J 20/22; B01J 20/32
[52] U.S. Cl. .................... 502/401; 502/407; 502/412; 210/924; 210/925
[58] Field of Search .............. 502/401, 412, 407; 210/924, 925

[56] References Cited

U.S. PATENT DOCUMENTS

| | | | |
|---|---|---|---|
| 2,367,384 | 1/1945 | Tymstra et al. | 210/1 |
| 2,510,661 | 6/1950 | Safford | 92/21 |
| 2,668,151 | 2/1954 | Wesley et al. | 252/428 |
| 3,382,170 | 5/1968 | Pape | 210/36 |
| 3,487,928 | 1/1970 | Canevari | 210/40 |
| 3,600,329 | 8/1971 | Enriquez et al. | 502/412 |
| 3,960,521 | 6/1976 | Keuppa et al. | 502/401 |
| 4,054,689 | 10/1977 | Calvin | 427/215 |
| 4,793,921 | 12/1988 | Hauck et al. | 502/401 |

FOREIGN PATENT DOCUMENTS 0112834  6/1984  Japan ................... 502/412

*Primary Examiner*—Carl F. Dees
*Attorney, Agent, or Firm*—Eugene M. Eckelman

[57] ABSTRACT

A process and product wherein a siliceous particulate material, that has been treated at room temperature with silicone thinned with a volatile thinner, is rendered hydrophobic and capable of absorbing oil. Particle size is between 25 and 4500 microns and treatment of the particulate material with silicone is in the proportion of approximately 5 liters of the thinned silicone to 1 cubic meter of the particulate material.

8 Claims, No Drawings

ENVIRONMENTAL PRODUCT CAPABLE OF ABSORBING OIL FROM THE SURFACE OF WATER, AND PROCESS

BACKGROUND OF THE INVENTION

This invention relates to new and useful improvements in a particulate material of a formulation that is rendered hydrophobic but will absorb an oil film from a body of water, to a process of making the formulation, and to a process of removing oil films from the surface of a body of water.

DESCRIPTION OF THE PRIOR ART

Accidental spillage of oil into bodies of water is a well known problem and many efforts have been made to remove such pollutant in order to restore the quality of the water to desired characteristics. Included in such attempts have been the use of chemical additives to cause a change in the characteristics of the oil, the use of confining devices to form barriers to prevent the spread of oil with pump devices associated therewith for removing the oil from the surface of the water, the use of various materials to absorb the oil from the water, and many other endeavors to separate oil or other floating pollutants from the surface of the water all of which have worked to some degree.

Regarding the use of an oil absorbent type process, U.S. Pat. No. 3,382,170 proposes the coating of perlite with silicone to provide a material that is hydrophobic but that nevertheless will absorb oil. In the process of making this product, perlite is heated to a high temperature, namely, to a temperature between 200° C. and 500° C. This treatment is stated to soften and expand the perlite. After such heated step, an aqueous silicone emulsion is sprayed on the material while the material is of a temperature no lower than 200° C. It is also stated that such treatment of the perlite appears to render the porous particles hydrophobic without affecting its porosity, capillary or oil-absorbing qualities. The perlite is first reduced to the very small size of 10 microns and 21 mm.

SUMMARY OF THE INVENTION

An object of the invention is to provide an improved particulate material of a formulation that is hydrophobic but that will nevertheless absorb an oil film when spread on the surface of the water on which the oil film exists. It is also the object of the invention to provide an improved process for making the formulation and to a process of removing oil films from the surface of a body of water.

A further object is to treat a particulate siliceous material with silicone in a process that can be carried out at room temperature whereby to avoid the necessity of utilizing high temperatures in an initial step of the process. Another object is to provide such a process that does not require the silicone to be in a watery emulsion.

In carrying out these objectives, it is found that an efficient particulate siliceous material for absorbing oil and yet one that can be rendered hydrophobic can be produced at room temperature by treating the particles with a liquid from the silicone family which has been thinned with a volatile thinner to reduce viscosity. The material is reduced to a particle size in a range of at least 25 microns up to approximately 4500 microns. The silicone is thinned to reduce viscosity with a volatile thinner prior to treating the particulate material. Diatomaceous earth is a preferred form of siliceous material as related to the instant invention.

DESCRIPTION OF PREFERRED EMBODIMENTS

The invention is concerned with the use of siliceous or silica bearing minerals as the absorbing base material. Examples of such absorbents are diatomaceous earth, natural, calcined, and flux calcined, also with clay granules or montmorillonite, kaolin, hectorite, attapulgite, bentonite, talc, and perlite. Best results have been obtained from the use of diatomaceous earth since it is a high surface area mineral as measured by the B.E.T. nitrogen absorption method.

The base material, such as diatomaceous earth, is prepared by reducing it to a selected size, namely, a minimum size of approximately 25 microns and a maximum size of approximately 4500 microns, preferably 180 microns and above. The base material in a dry state and at room temperature is treated with silicone that has been thinned to reduce its viscosity with a volatile thinner such as toluene, mineral spirits, alcohol, ether, methanol, and isopropenol. The percentage of thinner to silicone is approximately 90 percent thinner and 10 percent silicone. The silicone can be sprayed on the particulate material or if desired the latter can be subjected to a silicone bath. A preferred proportion of silicone to the particulate material is approximately 5 liters of thinned silicone to 1 cubic meter of the particulate material. The time that the material is subjected to the silicone comprises a time sufficient to coat the particles such as to render the particles hydrophobic.

Since the thinner in the silicone is of volatile nature, it will evaporate in a short time after the coating step and the particulate is ready for use. The vapors from the thinner may be recovered.

EXAMPLE I

A siliceous or silicone-bearing material reduced to a micron size of between 25 and 4500 microns is treated at room temperature with silicone that has been thinned with a volatile thinner of approximately 90 percent thinner to 10 percent silicone. Approximately 5 liters of the thinned silicone was used to treat 1 cubic meter of the material. After treatment with the silicone, the volatile thinner is evaporated off and the product is ready for use. The vapors from the evaporated thinner were recovered by a conventional recovery system.

EXAMPLE II

The steps of Example I were carried out in combination specifically with diatomaceous earth as the siliceous material. This is a preferred product since diatomaceous earth has the cellular formation that operates efficiently to absorb and retain oil and at the same time be capable of being rendered hydrophobic after the silicone treatment steps of the invention.

The product of the invention and the process of preparing it thus relate to a particulate material that is absorbent to hydrocarbons, i.e. is oleophilic, but at the same time is hydrophobic and repellant to water. The finished product is highly buoyant and will remain in such condition for long periods of time.

The product can be used to carry out a process of spreading it on the surface of water that may have a film of oil thereon whereby the hydrophobic particulate material will float on the surface and absorb oil that may be floating on the surface. The extent of oil absorption, the hydrophobic qualities, and the buoyancy of the particulate material, provide for improved pickup of oil films on water.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. An environmental particulate product capable of spreading on the surface of a body of water and capable of absorbing an oil film floating on the surface of the water, comprising:

a siliceous particulate material that has been treated at room temperature with silicone in liquid form thinned with a volatile thinner, said silicone upon evaporation of said liquid thinner therefrom and upon treating said particulate material therewith producing a coating and impregnation of said particulate material that renders the particulate material highly hydrophobic, buoyant, and capable of absorbing oil.

2. The product of claim 1 wherein said siliceous particulate material comprises diatomaceous earth.

3. The product of claim 1 wherein said particulate material is of a particle size from approximately 25 to 4500 microns.

4. The product of claim 1 wherein treatment of the particulate material with silicone is in the proportion of approximately 5 liters of thinned silicone to 1 cubic meter of the particulate material.

5. A process of preparing an environmental particulate product capable of spreading on the surface of a body of water and capable of absorbing an oil film floating on the surface of the water consisting essentially of the steps of:

treating a siliceous particulate material at room temperature with a liquid silicone thinned with a volatile thinner, and removing said thinner by one of an evaporation and condensation method, said silicone upon evaporation of said liquid thinner therefrom and upon treating said particulate material therewith producing a coating and impregnation of said particulate material that renders the particulate material highly hydrophobic, buoyant, and capable of absorbing oil.

6. The process of claim 5 wherein said siliceous particulate material comprises diatomaceous earth.

7. The process of claim 5 wherein said particulate material is of a particle size in the range of approximately 25 to 4500 microns.

8. The process of claim 5 wherein the treatment of the particulate material with silicone is in the proportion of approximately 5 liters of thinned silicone to 1 cubic meter of the particulate material.

* * * * *